United States Patent
Wang et al.

(10) Patent No.: US 11,470,658 B2
(45) Date of Patent: Oct. 11, 2022

(54) METHOD FOR DATA OFFLOADING, METHOD FOR DRB IDENTIFIER ALLOCATING, METHOD FOR RESOURCE RELEASING, AND DEVICE

(71) Applicant: SAMSUNG ELECTRONICS CO., LTD., Suwon-si (KR)

(72) Inventors: Hong Wang, Beijing (CN); Lixiang Xu, Beijing (CN); Weiwei Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 16/959,569

(22) PCT Filed: Feb. 12, 2019

(86) PCT No.: PCT/KR2019/001684
§ 371 (c)(1),
(2) Date: Jul. 1, 2020

(87) PCT Pub. No.: WO2019/160298
PCT Pub. Date: Aug. 22, 2019

(65) Prior Publication Data
US 2020/0389810 A1    Dec. 10, 2020

(30) Foreign Application Priority Data

Feb. 13, 2018  (CN) .......................... 201810149995.6
Aug. 7, 2018  (CN) .......................... 201810892475.4

(51) Int. Cl.
*H04W 76/11*    (2018.01)
*H04W 76/20*    (2018.01)
*H04W 28/02*    (2009.01)

(52) U.S. Cl.
CPC ........ *H04W 76/11* (2018.02); *H04W 28/0268* (2013.01); *H04W 76/20* (2018.02)

(58) Field of Classification Search
CPC . H04W 28/0268; H04W 76/11; H04W 76/20; H04W 76/34; H04W 28/0263;
(Continued)

(56) References Cited

U.S. PATENT DOCUMENTS

2020/0120535 A1    4/2020  Dai et al.
2020/0322831 A1*  10/2020  Xu .................... H04W 28/0268

FOREIGN PATENT DOCUMENTS

WO    2018/228166    12/2018
WO    2018/230982    12/2018

OTHER PUBLICATIONS

Extended Search Report dated Jan. 22, 2021 in counterpart European Patent Application No. 19754678.1.
(Continued)

*Primary Examiner* — Peter P Chau
(74) *Attorney, Agent, or Firm* — Nixon & Vanderhye P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present application provides a method for establishing dual connectivity to ensure data continuity in 5G architecture. Related information of a mapping of a QoS Flow to a data radio bearer (DRB) is transmitted, by a first node, to a second node; the related information of the mapping carries indication information; response information in response to the information related to the mapping is received from the second node; and based on the response information, data is transmitted to the second node. The method of the present application may correctly configure dual connectivity
(Continued)

resources, reduce signaling interaction, avoid configuration conflicts, optimize resource configuration, and improve the reliability of transmitting user data.

16 Claims, 8 Drawing Sheets

(58) Field of Classification Search
CPC ......... H04W 28/0815; H04W 28/0967; H04W 76/15; H04W 92/20; H04W 28/08; H04W 28/0252; H04W 76/36
See application file for complete search history.

(56) References Cited

OTHER PUBLICATIONS

Huawei et al.: "DRB ID allocation for Option 4 and Option 7", 3GPP Draft; R2-1800725, DRB ID Allocation for Option 4 and 7, 3GPP TSG-RAN WG2 NR Ad hoc 1801, Jan. 12, 2018, XP051386306 (2 pages).

Catt, "TP for 38.423 on Data forwarding for Xn Handover", R3-180147, 3GPP TSG-RAN WG3 Nr Adhoc 1801, Sophia Antipolis, France, Jan. 12, 2018, 6 pages.
Ericsson, "PDU Session Split at UpfPF", R3-180571, 3GPP TSG-RAN WG3 Adhoc 1801, Sophia Antipolis, France, Jan. 30, 2018, 7 pages.
Nokia et al., "Finalization of Data Forwarding at 4G to 5G Handover", R3-180215, 3GPP TSG-RAN WG3 NR Adhoc 1801, Sophia Antipolis, France, Jan. 12, 2018, 6 pages.
Nokia et al., "Text Proposal for stage 2 data forwarding", R3-180585, 3GPP TSG-RAN WG3 Adhoc 1801, Sophia Antipolis, France, Jan. 30, 2018, 4 pages.
Samsung, "Data Forwarding in Xn Based Handover", R3-180258, 3GPP TSG-RAN WG3 NR Adhoc 1801, Sophia Antipolis, France, Jan. 12, 2018, 11 pages.
Samsung, "Dual Connectivity establishment in new QoS framework", R3-180259, 3GPP TSG-RAN WG3 Adhoc 1801, Sophia Antipolis, France, Jan. 12, 2018, 13 pages.
International Search Report for PCT/KR2019/001684 dated Jul. 31, 2019, 5 pages.
Written Opinion of the ISA for PCT/KR2019/001684 dated Jul. 31, 2019, 6 pages.

* cited by examiner

METHOD FOR DATA OFFLOADING, METHOD FOR DRB IDENTIFIER ALLOCATING, METHOD FOR RESOURCE RELEASING, AND DEVICE

This application is the U.S. national phase of International Application No. PCT/KR2019/001684 filed Feb. 12, 2019 which designated the U.S. and claims priority to CN Patent Application No. 201810149995.6 filed Feb. 13, 2018, and CN Patent Application No. 201810892475.4 filed Aug. 7, 2018, the entire contents of each of which are hereby incorporated by reference.

TECHNICAL FIELD

The present application relates to wireless communication technologies, and in particular, to a method for data offloading, a method for DRB identifier allocating, a method for resource releasing, and a device.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "communication and network infrastructure" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

5G refers to the fifth generation of mobile communication technology. Unlike the previous four generations, 5G is not a single wireless technology, but a convergence of existing wireless communication technologies. At present, the peak rate of LTE may reach 100 Mbps, and the peak rate of 5G will reach 10 Gbps, which is 100 times higher than that of 4G. The existing 4G network has limited processing ability and cannot support some services, for example, high-definition video, high fidelity voice, augmented reality, virtual reality and the like. 5G will introduce more advanced technologies to meet the growth of mobile service traffic through higher spectrum efficiency, more spectrum resources and more dense cells, to solve the problems faced by the 4G network, and to build a network with high-speed transmission rate, high capacity, low latency, high reliability, and excellent user experience. As shown in FIG. 1, 5G architecture includes a 5G access network and a 5G core network, and a UE communicates with a data network through the access network and the core network.

In network evolution, the first phase will continue to use LTE base station eNB, while being able to support 5G terminals and use 5G features. Therefore, some base stations gNBs with 5G access technologies will be deployed, and the gNBs may serve as secondary base stations, and provide data transmission to the UE together with the LTE base stations. The 5G base station has no signaling connection with the core network control node MME, but only has user plane connection with the core network gateway SGW. The LTE base station and the LTE core network may be reused in this architecture, which is attractive to operators and expected for operators. Specifically, the LTE base station configures the 5G base station, and uses the dual connectivity technology defined in the LTE system to transmit data to the UE. The LTE base station serves as a master base station and the 5G base station serves as a secondary base station. The second phase allows the eNB to connect with the 5G core network, and the eNB and gNB connected to the 5G core network are both next-generation access network nodes, i.e., NG RAN nodes. A Xn interface is established between the NG RAN nodes to establish a dual connectivity between the NG RAN nodes, which may improve data throughput.

The type of dual connectivity may have multiple bearer types, and as shown in FIG. 2, bearers of transmitted data may be divided, according to the locations of the upper layer protocol (the upper layer protocol includes SDAP and/or PDCP protocol) and the lower layer protocol (the lower layer protocol includes RLC, MAC, and physical layer), into the following types:

Master split bearer (MCG split bearer), of which the name may be another. The feature is that the upper layer protocol is established on the master base station, and the lower layer protocol is established on the master base station and the secondary base station. For the downlink data, the master base station receives data from the core network, and then the PDCP protocol stack splits the downlink data into two paths, and sends them to the UE through the lower layer protocols on the master base station and the secondary base station respectively. For the uplink data, the PDCP on the UE may split the uplink data into two paths, and after being processed by the lower layer protocol, send them to the master base station and the secondary base station, respectively.

Secondary bearer (SCG bearer), of which the name may be another. The feature is that both the upper layer protocol and the lower layer protocol are established on the secondary base station. For downlink data, the secondary base station receives data from the core network, and then the secondary base station processes it and sends it to the UE. For uplink data, the UE sends the uplink data to the secondary base station.

Secondary split bearer (SCG split bearer), of which the name may be another. The feature is that the upper layer protocol is established on the secondary base station, and the lower layer protocol is established on the master base station and the secondary base station. For the downlink data, the secondary base station receives data from the core network, and then the PDCP protocol stack splits the downlink data into two paths, and sends them to the UE through the lower layer protocols on the master base station and the secondary base station respectively. For the uplink data, the PDCP on the UE may split the uplink data into two paths, and after being processed by the lower layer protocol, send them to the master base station and the secondary base station, respectively.

X bearer, of which the name may be another. The feature is that the upper layer protocol is established on the master base station and the lower layer protocol is established on the secondary base station.

Y bearer, of which the name may be another. The feature is that the upper layer protocol is established on the secondary base station, and the lower layer protocol is established on the master base station.

In 5G technology, some technologies different from 4G technology are adopted, for example, in the QoS architecture, 5G defines a new mode. When establishing the data connection (PDU Session), the core network sends the default QoS policy or/and the authenticated QoS policy to the RAN and the UE. The data connection is the transmission path between the UE and the core network. The transmission path between the core network and the base station, and the radio bearer between the base station and the UE are included. The PDU Session is the connection between the UE and the packet data network, and this connection is used to transmit data units, in which, generally, one PDU Session is established for one service. Data unit types include IP data, Ethernet data, and non-IP data. When establishing the PDU session, the core network sends the QoS policy to the RAN through the NG interface, and sends the QoS policy to the UE through the NAS interface. The QoS policy includes the indication/description information of the QoS Flow, and also includes specific QoS information, for example data delay target, data error rate, data priority, guaranteed data rate, maximum data rate, etc., and may also include other information, for example, information of the application layer. The RAN establishes a default data radio bearer DRB according to the requirement of the QoS, and in addition to the default DRB, the RAN may establish other DRBs at the same time. In the user plane, the core network combines the data packets into the QoS Flow, and adds the QoS indication information to the data header of the QoS Flow. According to the QoS indication information, the RAN may find the corresponding specific parameters according to the received QoS policy, and, according to the parameters in the QoS policy, the user plane data is used for performing corresponding processes to meet quality requirements. The core network sends the data packet with the QoS indication information to the RAN, and the RAN maps the QoS Flow into the resource and the radio bearer of the access network, for example, the RAN determines that the QoS Flow is mapped to a data bearer DRB, or establishes a new data bearer DRB for the QoS Flow. When to establish a new DRB, it is determined by the RAN, and may be established after receiving the signaling of the core network, or after receiving the data of the QoS Flow user, according to the QoS indication information included in the header of the QoS Flow, which the RAN may know the specific QoS requirement corresponding to the QoS Flow through the QoS indication information in combine with the default QoS policy saved by the RAN and/or the pre-authentication QoS policy, if the current established DRB is suitable for carrying the data required by the QoS according to the QoS requirement, then the QoS Flow is transmitted via this DRB. If not, the RAN may determine to establish a new DRB and use the new DRB to carry the QoS Flow.

DISCLOSURE OF INVENTION

Technical Problem

In dual connectivity, both the master base station and the secondary base station are RAN nodes, and the QoS Flow may be offloaded by the master base station to the secondary base station in a dual connectivity manner, or vice versa. Both the master base station and the secondary base station may determine the mapping of QoS Flow to the data radio bearer, so the three following problems are required to be solved:

1. how to ensure continuity of data when the data is offloaded;

2. how to ensure that the radio data bearer allocated by the secondary base station does not conflict with the radio data bearer allocated by the master base station;

3. when there is a problem with some resources in the master base station or the secondary base station, or the capacity is insufficient, how to modify configurations of the resources, or change the location of the upper layer protocol or the lower layer protocol;

in order to solve the above problems, the current dual connectivity process is required to be modified accordingly.

Solution to Problem

The present application provides a method for establishing dual connectivity to ensure data continuity in the 5G architecture.

The present application provides a method for data offloading, including:

transmitting, by a first node, related information of a mapping of a QoS Flow to a data radio bearer (DRB) to a second node, wherein the related information of the mapping carries indication information;

receiving response information in response to the related information of the mapping from the second node; and, transmitting data to the second node based on the response information.

Wherein, the related information of the mapping further includes at least one of the following:
an identifier of the data radio bearer DRB; and,
a list of QoS Flow identifiers.

The indication information indicates DRB offloading, or indicates whether all QoS Flows established on the DRB are offloaded to the second node, or whether partial QoS Flows on the DRB are offloaded to the second node.

Alternatively, the indication information indicates whether lossless of data is possible or impossible.

Alternatively, the indication information indicates whether the second node is to establish a data forwarding tunnel for the DRB.

Specifically, the indication information may be indicated by a displayed information element, for example, the indication information is set to one of the following:
  "DRB offloading indication": if the message sent by the first node to the second node includes this indication information, it indicates that it is DRB offloading, and if not, it indicates that it is QoS Flow offloading. The DRB offloading means that all QoS Flows originally established on the DRB of the first node are offloaded to the second node, and the QoS Flow offloading means that partial QoS Flows originally established on the DRB of the first node are offloaded to the second node. After the second node receiving the indication information, the action of the second node is: for the DRB offloading, the second node may determine to use the old mapping, that is, to use the DRB identifier allocated by the first node for mapping the QoS Flow to the DRB, or the second node determines to use new mapping, that is, to allocate a new DRB, and determine which QoS Flows are mapped to which DRBs. If it is QoS Flow offloading, then the second node must adopt the new mapping, that is, allocating a new DRB identifier to determine which QoS Flows are mapped to which DRBs.
  "QoS Flow offloading": if the message sent by the first node to the second node includes this indication information, it indicates that it is QoS Flow offloading, and if not, it indicates that it is DRB offloading. After the second node receiving the indication information, the actions of the second node are as described above.
  "Offloading Type", which may be further set to "QoS Flow offloading" or "DRB offloading". After the second node receiving this indication information, the actions of the second node are as described above.

Alternatively, the indication information may be obtained by using a list of the QoS Flows to be offloaded and mapping information of the QoS Flows to the DRBs included in the message sent by the first node to the second node. The mapping information of the QoS Flows to the DRBs includes the identifiers of the DRBs established on the first node and the list of all QoS Flows borne on the DRB. If the list of the QoS Flows to be offloaded is consistent with a list of all QoS Flows borne on one DRB, then it represents the DRB offloading, and if the list of the QoS Flows to be offloaded includes less QoS Flow identifiers than these included in a list of all QoS Flows on the DRB, then it means the QoS Flow offloading. After the second node receiving the indication information, the actions of the second node are as described above.

Alternatively, the indication information may be obtained by whether the mapping information of the QoS Flows to the DRBs is included in the message sent by the first node to the second node. The mapping information of the QoS Flow to the DRB includes the identifiers of the DRBs established on the first node and the list of all QoS Flows borne on the DRB. If the mapping information is included in the message, it represents the DRB offloading, and if the mapping information is not included, it represents the QoS Flow offloading. After the second node receiving the indication information, the actions of the second node are as described above.

Alternatively, the indication information may be obtained by whether the message sent by the first node to the second node includes the list of the mapped QoS Flows. The mapping information of the QoS Flow to the DRB includes the identifiers of the DRBs established on the first node and the list of all QoS Flows borne on the DRB, and the list of the QoS Flows borne on the DRB is the list of the mapped QoS Flows. If the message includes the DRB identifiers and the list of the mapped QoS Flows, it represents the DRB offloading, and if only the DRB identifiers are included and the list of the mapped QoS Flows is not included, it represents the QoS Flow offloading. After the second node receiving the indication information, the actions of the second node are as described above.

The first node may be a master base station or a secondary base station.

The second node may be a secondary base station or a master base station.

The second node determines whether to establish a data forwarding tunnel for the DRB and a data forwarding tunnel for the PDU session according to the indication information, or to establish a data forwarding tunnel only for the PDU session.

The present application provides a method for allocating data bearer identifiers, including:
notifying, by a first node, first related information of a DRB identifier to a second node; and,
receiving, by the first node, second related information of the DRB identifier sent by the second node.

The first node is a master base station or a secondary base station in dual connectivity or multiple connectivity.

The second node is a secondary base station or a master base station in dual connectivity or multiple connectivity.

The first related information includes at least one of the following:
a list of identifiers of all DRBs allocated by the first node;
a list of identifiers of DRBs available to the second node;
segmentation information, for indicating a start identifier and an end identifier of an identifier of a DRB available to the first node or the second node;
an identifier of a DRB available to the second node pre-allocated by the first node;
the number of identifiers of the DRBs required by the first node; and,
an identifier of a DRB temporarily allocated by the first node.

The second related information includes at least one of the following:
an identifier of the DRB determined by the second node; and,
an identifier of the DRB allocated by the second node for the first node.

The present application provides a method for resource releasing, including:
receiving, by a master base station, a bearer release message from a secondary base station, wherein the bearer release message carries indication information;

sending, by the master base station, response information in response to the bearer release message to the secondary base station.

The indication information indicates whether an upper layer resource is overloaded or a lower layer resource is overloaded, or an upper layer resource is available or a lower layer resource is available.

After the master base station receiving the bearer release message from the secondary base station, the master base station determines whether to configure corresponding resources on the secondary base station according to the indication information.

The present application provides a control plane node, including:

a processor; and, a memory, storing instructions that, when executed by the processor, enable the processor to perform any one of the method for data offloading, the method for DRB identifier allocating, and the method for resource releasing.

The methods of the present application may correctly configure dual connectivity resources, reduce signaling interaction, avoid configuration conflicts, optimize resource configuration, and improve reliability of transmitting user data.

Advantageous Effects of Invention

The present application proposes a method for establishing dual connectivity to ensure data continuity when the master base station and the secondary base station determine that the mapping of QoS Flow to DRB is different.

MODE FOR THE INVENTION

Figure 1:
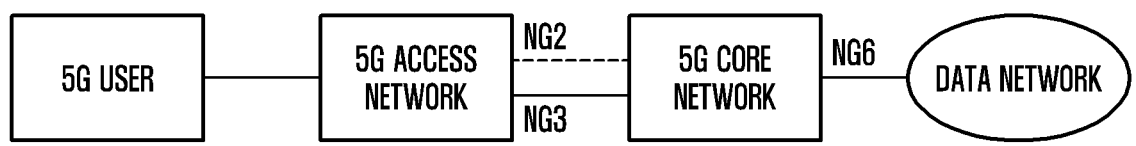
FIG. 1 is an architecture diagram of 5G system.
Figure 2:
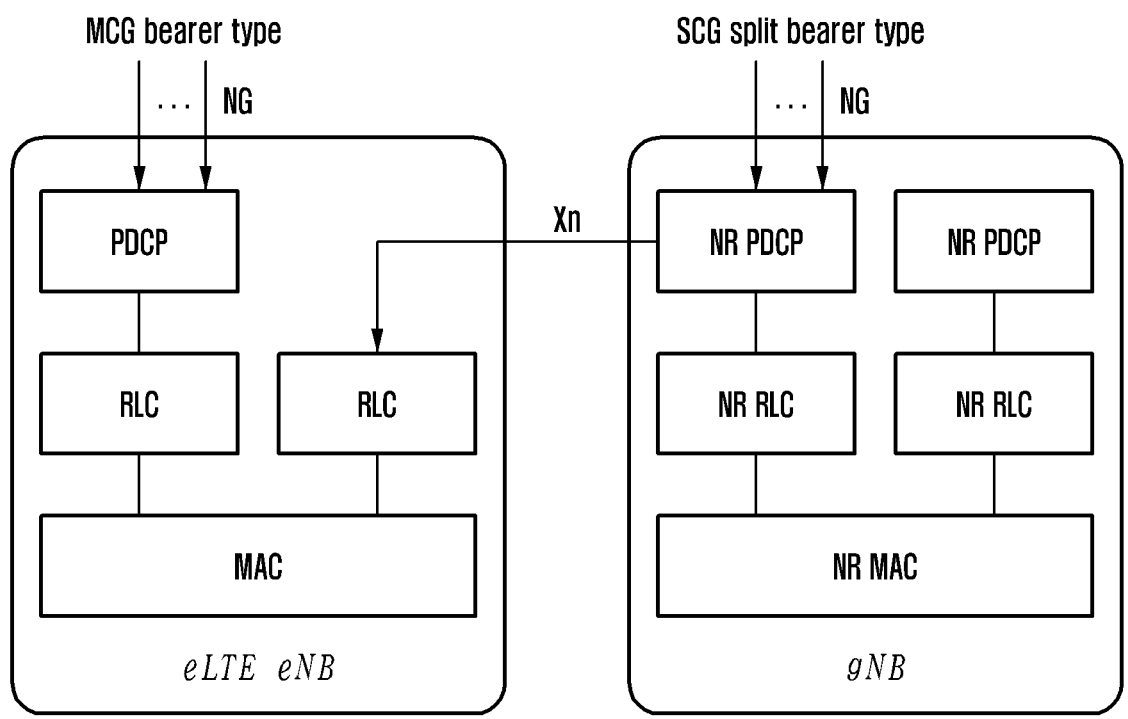
FIG. 2 is a schematic diagram of a dual connectivity architecture.

In order to make the objects, technical solutions and advantages of the present application clearer, the present application will be further described in detail below with reference to the accompanying drawings. It should be noted that the present disclosure is illustrated but not limited by the following description. In the following description, numerous specific details are set forth, in order to provide a thorough understanding of the present disclosure. However, it will be apparent to those skilled in the art that the present disclosure may be practiced without these specific details. In other instances, well-known circuits, materials, or methods are not described in detail in order to avoid obscuring the present disclosure.

References throughout this description to "one embodiment", "an embodiment", "one example" or "an example" means that a particular feature, structure, or characteristic described in connection with the embodiment or example is included in at least one embodiment of the present disclosure. Thus, the phrase "in one embodiment", "in an embodiment", "in one example" or "in an example" throughout the description does not necessarily refer to the same embodiment or example. In addition, specific features, structures, or characteristics may be combined in one or more embodiments or examples in any suitable combination and/or sub-combination. In addition, it will be understood by these skilled in the art that the drawings provided herein are for the purpose of illustration and that the drawings are not necessarily to scale. The term "and/or" as used herein includes any and all combinations of one or more of the items listed.

When establishing dual connectivity, if a master base station notifies a secondary base station that an upper protocol (the upper layer protocol including the SDAP and/or the PDCP protocol) is required to be established on the secondary base station, in one case, the master base station informs the secondary base station a list of all QoS Flows and the DRB identifiers corresponding to the upper layer protocol, and if the secondary base station does not change the mapping of QoS Flow to DRB, it needs to establish a data forwarding tunnel to forward the data saved/cached on the master base station to the secondary base station through the data forwarding tunnel. The data cached on the master base station may be divided into two types, of which one is the data that has been mapped to the DRB, and the other is the data that has not been mapped to the DRB. The cached data has not been successfully sent to the UE, and in order to ensure data continuity, the data should be forwarded from the master base station to the secondary base station and sent by the secondary base station to the UE. The secondary base station may establish two tunnels, of which one is a tunnel established for the DRB to forward the data having been mapped to the DRB, and the other is a tunnel established for PDU Session to forward the data that is not mapped to the DRB. The secondary base station first transmits the forwarded data to the UE, and then transmits the data received from a core network. If the data cached on the master base station is not forwarded to the secondary base station, the data is interrupted. In the other case, the master base station determines to offload partial QoS Flows mapped to a certain DRB to the secondary base station, and the master base station notifies the secondary base station of a list of the partial QoS Flows and the identifiers of the DRB, which the secondary base station cannot correctly distinguish the two cases. If the two cases cannot be distinguished, the secondary base station cannot correctly configure the latter case, for example, for the latter case, the secondary base station needs to allocate a new DRB identifier and only establish a tunnel for the PDU Session. In order to ensure continuity of the data or continuity of services, reduce data loss, and ensure that the secondary base station may correctly configure the UE, the method of the present application is required. In addition, both the master base station and the secondary base station may allocate the data radio bearer identifier for the data radio bearer, wherefore, the method of the present application is required to ensure that the identifier of the data radio bearer allocated by the secondary base station does not conflict with the identifier of the data radio bearer allocated by the master base station. When a problem occurs in some resources on the secondary base station, the normal service cannot be provided, and then the secondary base station is required to release the corresponding resources or the entire data radio bearers, and the master base station is notified which part of the resource has a problem. By adopting the methods of the present application, the master base station may determine new configuration according to the details of the secondary base station resources.

Embodiments of the present application will be described in detail in the following description, examples of which are shown in the accompanying drawings, in which the same or similar elements and elements having same or similar functions are denoted by like reference numerals throughout the description. The embodiments described herein with reference to the accompanying drawings are explanatory and illustrative, which are used to generally understand the present disclosure. The embodiments shall not be construed to limit the present disclosure.

Figure 3:
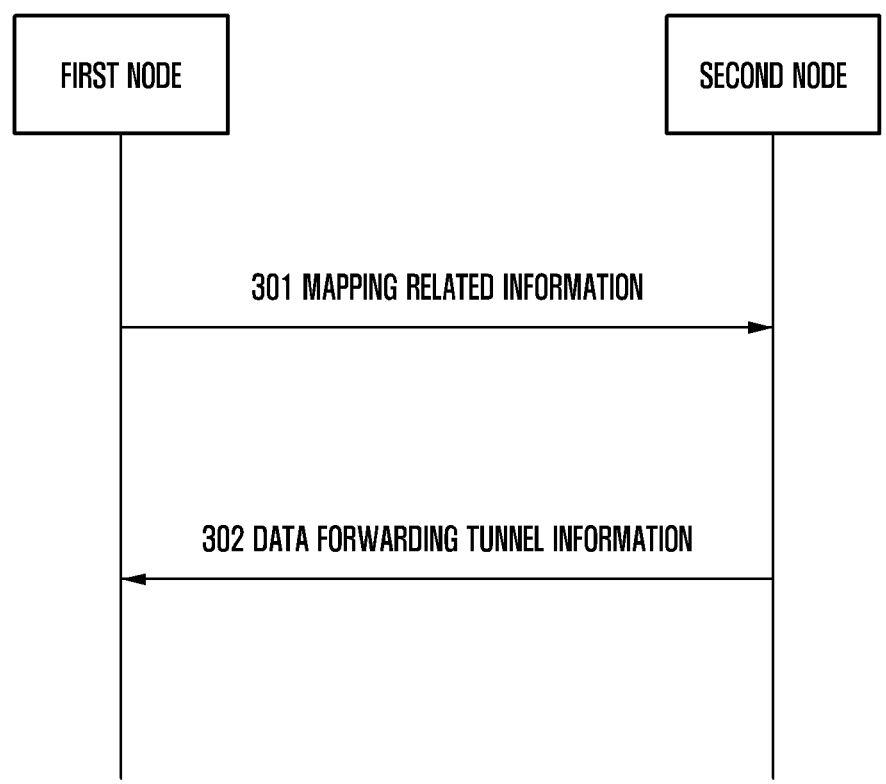
FIG. 3 is a schematic diagram of the first method of the present application.

FIG. 3 illustrates the first method of the present application, wherein the first node may be an eNB connected to the LTE core network, an eNB connected to the 5G core network, a gNB, or a node supporting non-3GPP access technologies, and the second node may be an eNB connected to the LTE core network, an eNB connected to the 5G core network, a gNB, or a node supporting non-3GPP access technologies. The first node is a master base station in dual connectivity or multiple connectivity, and the second node is a secondary base station in dual connectivity or multiple connectivity.

Step 301: notifying, by the first node, the second node of the information related to the mapping of the QoS Flow to the data radio bearer. The information related to the mapping of the QoS Flow to the data radio bearer indicates one or more of the following information:

- the identifier of the data radio bear DRB; the identifier of the DRB is the identifier of the DRB on the first node, and may also be referred to as the old DRB identifier. The first node is required to establish all or partial resources corresponding to the DRBs on the second node, and the resources corresponding to the DRBs include the resources corresponding to the upper layer protocol (SDAP and/or PDCP) and the resources corresponding to the lower layer protocol (RLC, MAC, and physical layer). The resources corresponding to the upper layer protocol (SDAP and/or PDCP) are also referred to as upper layer resources, and the resources corresponding to the lower layer protocol (RLC, MAC, physical layer) are also referred to as lower layer resources. The upper layer resource and the lower layer resource may be configured on the master base station and the secondary base station, respectively, or may be configured both on the secondary base station.
- The list of the QoS Flow identifiers, which these QoS Flows are mapped to the DRB indicated by the data radio bearer identifiers; the list of the QoS Flow identifiers and the corresponding DRB identifiers indicate the mapping relationship between the QoS Flows and the DRBs on the first node, and the first node maps the QoS indicated in the list of the QoS Flows to the DRBs indicated by the data radio bearer identifiers.
- The list of QoS Flows to be offloaded. The first node determines which QoS Flows are offloaded to the second node. It may also include QoS quality configuration information corresponding to the QoS Flows.
- Indication information, which indicates whether it is a DRB offloading, or indicating whether all or partial QoS Flows established on the DRB are offloaded to the second node, that is, it indicates whether this is offloading at the DRB level or at the QoS Flow level. Alternatively, other indication information is used to indicate two different cases, of which the purpose is to enable the second node to distinguish between the two cases, and the second node may adopt different processing for the two cases, for example, the indication information indicates that data loss is possible or impossible, e.g., indicating "impossible to be loss", or the indication information indicates whether the second node is required to establish a data forwarding tunnel for the DRB.

For example, the indication information may be indicated by a displayed information element, for example, the indication information is set to one of the following:

- "DRB offloading indication": if the message sent by the first node to the second node includes this indication information, it indicates that it is DRB offloading, and if not, it indicates that it is QoS Flow offloading. The DRB offloading means that all QoS Flows originally established on the DRB of the first node are offloaded to the second node, and the QoS Flow offloading means that partial QoS Flows originally established on the DRB of the first node are offloaded to the second node. After the second node receiving the indication information, the action of the second node is: for the DRB offloading, the second node may determine to use the old mapping, that is, to use the DRB identifier allocated by the first node for mapping the QoS Flow to the DRB, or the second node determines to use new mapping, that is, to allocates a new DRB, and determine which QoS Flows are mapped to which DRBs. If it is QoS Flow offloading, then the second node must adopt the new mapping, that is, allocating a new DRB identifier to determine which QoS Flows are mapped to which DRBs.
- "QoS Flow offloading": if the message sent by the first node to the second node includes the indication information, it indicates that it is QoS Flow offloading, and if not, it indicates that it is DRB offloading. After the second node receiving the indication information, the actions of the second node are as described above.
- "Offloading Type", which may be further set to "QoS Flow offloading" or "DRB offloading". After the second node receiving the indication information, the actions of the second node are as described above.

Alternatively, the indication information may be obtained by using a list of the QoS Flows to be offloaded and mapping information of the QoS Flows to the DRBs included in the message sent by the first node to the second node. The mapping information of the QoS Flows to the DRBs includes the identifiers of the DRBs established on the first node and the list of all QoS Flows borne on the DRB. If the list of the QoS Flows to be offloaded is consistent with a list of all QoS Flows borne on one DRB, then it represents the DRB offloading, and if the list of the QoS Flows to be offloaded includes less QoS Flow identifiers than these included in a list of all QoS Flows on the DRB, then it means the QoS Flow offloading. After the second node receiving the indication information, the actions of the second node are as described above.

Alternatively, the indication information may be obtained by whether the mapping information of the QoS Flows to the DRBs is included in the message sent by the first node to the second node. The mapping information of the QoS Flows to the DRBs includes the identifiers of the DRBs established on the first node and the list of all QoS Flows borne on the DRB. If the mapping information is included in the message, it represents the DRB offloading, and if the mapping information is not included, it represents the QoS Flow offloading. After the second node receiving the indication information, the actions of the second node are as described above.

Alternatively, the indication information may be obtained by whether the message sent by the first node to the second node includes the list of the mapped QoS Flows. The mapping information of the QoS Flow to the DRB includes the identifiers of the DRBs established on the first node and the list of all QoS Flows borne on the DRB, and the list of the QoS Flows borne on the DRB is the list of the mapped QoS Flows. If the message includes the DRB identifiers and the list of the mapped QoS Flows, it represents the DRB offloading, and if only the DRB identifiers are included and the list of the mapped QoS Flows is not included, it represents the QoS Flow offloading. After the second node receiving the indication information, the actions of the second node are as described above.

The first node determines to establish a dual connectivity on the second node, and the first node notifies the second node of the required resources of the dual connectivity, for example, where the upper layer resources (the resources including SDAP and PDCP) are established, and/or the lower layer resources (for example, the resources of the SCG, or the resources of the MCG) are established. The first node also notifies the second node of the above-mentioned offloaded QoS Flow identifier, the identifier of the DRB, and the indication information. In addition, an implicit notification manner may also be used, for example, by indicating whether the DRB identifier is included or not. That is, if the QoS Flows established on the DRBs are all offloaded to the second node, the identifiers of the DRBs are included, and if only partial QoS Flows on the DRBs are established on the second node, the identifiers of the DRBs are not required.

Step 302: receiving, by the second node, the indication information, to find out, according to the indication information, whether the first node offloads all QoS Flows mapped to the DRB to the second node, or whether the data is impossible to be lost, or whether to establish a data forwarding tunnel for DRB, which the second node takes different behaviors. Then the second node sends a response message to the first node, and the message carries information for establishing a data forwarding tunnel.

Behavior I: if QoS Flows on the DRB are all offloaded to the second node, or the data is impossible to be lost, or a data forwarding tunnel for the DRB needs to be established, the second node obtains the mapping of the QoS Flow to the DRB determined by the first node, and the second node may determine whether to adopt the same mapping. If the same mapping is adopted, the second node uses the mapping relationship of the QoS Flow to the DRB determined by the first node, and uses the identifier of the DRB allocated by the first node, which the second node allocates a data forwarding tunnel address to the DRB to forward the PDCP packet that has been mapped to the DRB on the first node but has not been successfully sent to the UE. Optionally, the second node may also establish a data forwarding tunnel for the PDU session to forward the data packet received on the first node that have not yet been mapped to the DRB. If the second node determines to adopt new mapping, the second node only allocates a data forwarding address for the PDU session.

Behavior II: if QoS Flows on the DRB are all offloaded to the second node, or the data is impossible to be lost, or a data forwarding tunnel for the DRB needs to be established, that is, only the data forwarding tunnel of the PDU session needs to be established, the second node does not need to refer to the mapping of the QoS Flow to the DRB determined by the master base station, and the second base station determines the mapping of the QoS Flow to the DRB, and establishes a data forwarding tunnel for the PDU session to forward the data pocket received on the first node that has not yet mapped to the DRB. The second node needs to allocate a DRB identifier for the new DRB, and for how to allocate, it may be referred to the second method of the present application.

The first node receives the response message, and sends the cached data to the tunnel according to the information of the data forwarding tunnel carried in the response message.

Figure 4:
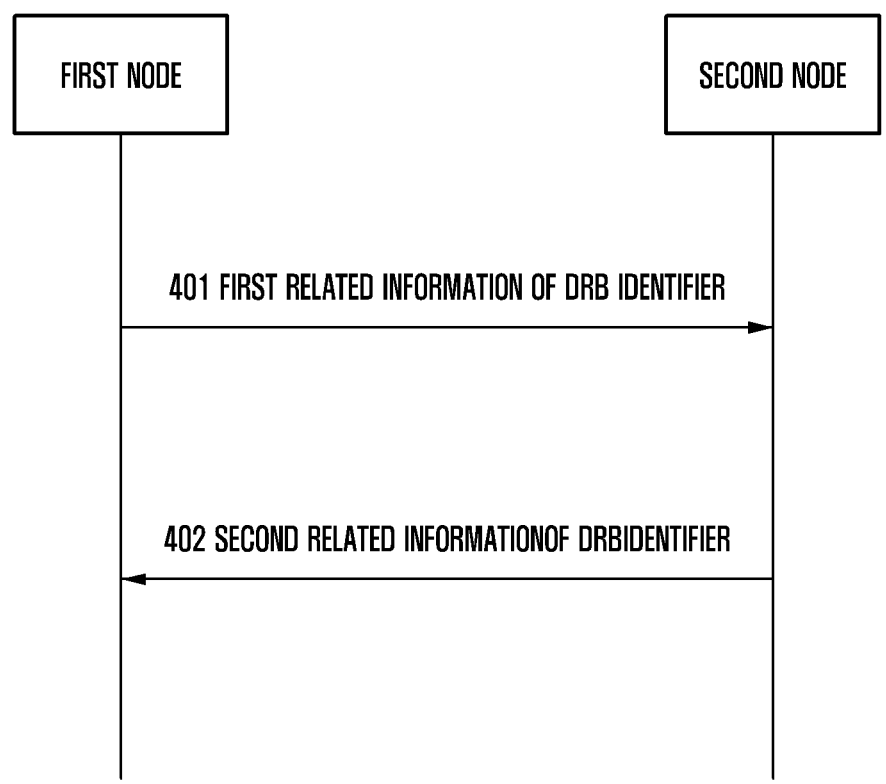
FIG. 4 is a schematic diagram of the second method of the present application.

FIG. 4 illustrates the second method of the present application.

Step 401: notifying, by the first node, the first related information of the DRB identifier to the second node. Wherein, the first node may be an eNB connected to the LTE core network, an eNB connected to the 5G core network, a gNB, or a node supporting non-3GPP access technologies, and the second node may be an eNB connected to the LTE core network, an eNB connected to the 5G core network, a gNB, or a node supporting non-3GPP access technologies. The first node is a master base station or a secondary base station in dual connectivity or multiple connectivity, and the second node is a secondary base station or a master base station in dual connectivity or multiple connectivity. The first related information of the DRB identifier may be one or more of the following information:

a list of identifiers of all DRBs that the first node has allocated;
a list of identifiers of DRBs available to the second node; that is, a list of identifiers of the DRBs that are not configured for the UE by the first node, wherein the second node may select one or more among them to configure for the upper layer resources to establish bearer on the secondary base station;
segmentation information, for indicating a start identifier and an end identifier of an identifier of a DRB available to the first node or the second node;
an identifier of a DRB available to the second node pre-allocated by the first node;
the number of identifiers of DRBs required by the first node; and,
an identifier of a DRB temporarily allocated by the first node.

Step 402: notifying, by the second node, the first node of the second related information identified by the second node.

The second node determines the mapping relationship of the QoS Flow to the DRB, as well as the identifier of the DRB, and the second node sends a message to the first node, to notify the identifier of the DRB determined by the second node, which may also carry the resource of the upper layer protocol or the lower layer protocol corresponding to the data radio bearer determined by the second node. The second related information of the DRB identifier may be one or more of the following information:

the identifier of the DRB determined by the second node; the second node may determine, according to the first related information of the DRB identifier sent by the first node, information about the DRB available to the second node, and select one or more pieces among them as the identifier of the DRB established by the upper layer resource on the secondary base station;
the identifier of the DRB allocated by the second node for the first node, which is the corresponding DRB identifier for the first node allocated by the second node according to the number of the identifiers of the DRBs required by the first node in Step 401;

the identifier of the DRB allocated by the second node for the first node, wherein, the second node determines the DRB identifier that may be used by the first node, which may be consistent with the allocated temporary DRB identifier, according the allocated temporary DRB identifier sent by the first node in Step 401, or the second node determines a new DRB identifier to send to the first node when there is a conflict of the DRB identifier.

Figure 5:
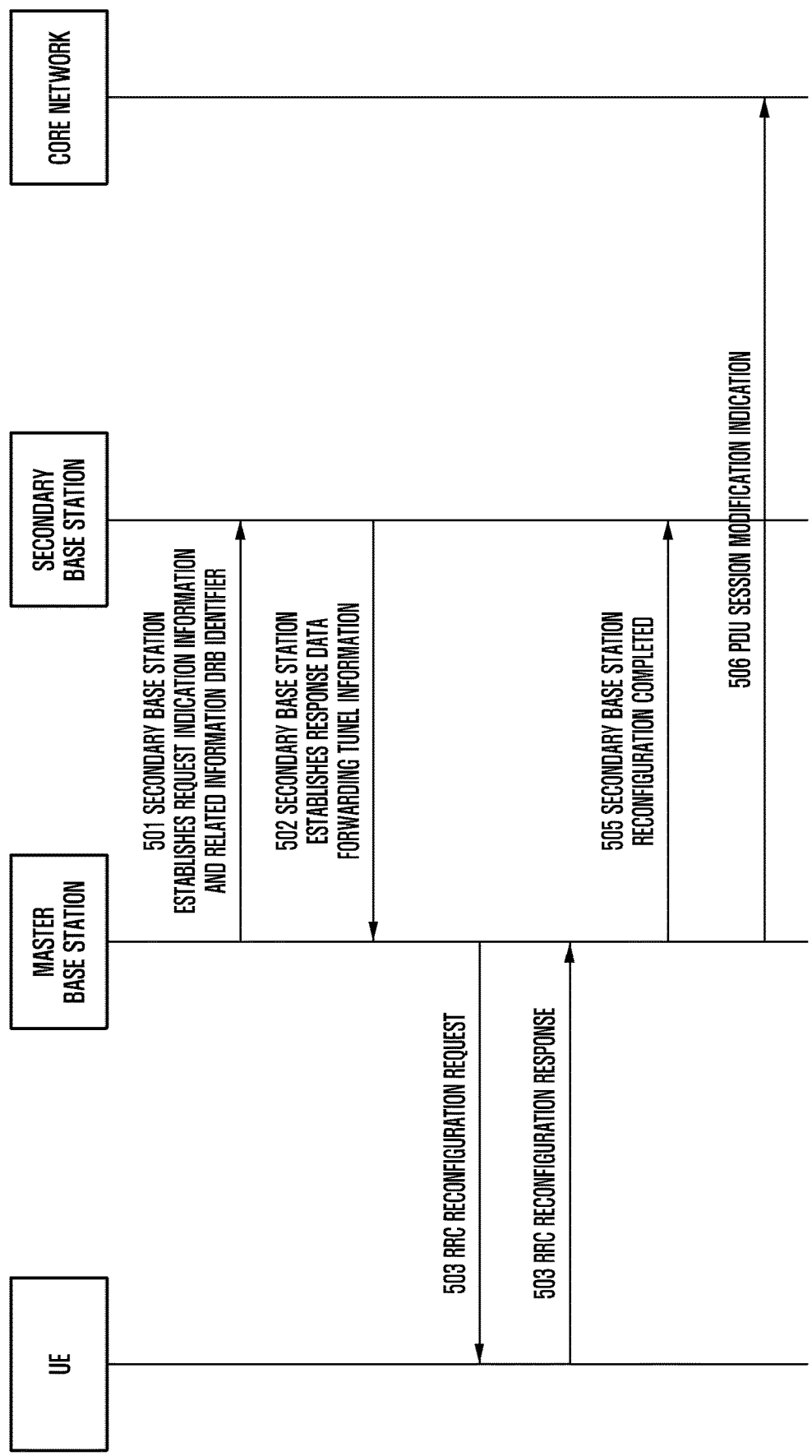
FIG. 5 is a schematic diagram of the first embodiment of the present application.

FIG. 5 illustrates the first embodiment of the present application, which shows a process of establishing a secondary base station or a process of modifying a secondary base station.

The master base station determines to establish dual connectivity or multiple connectivity on the secondary base station, and the master station notifies the secondary base station of the list of the QoS Flows to be offloaded to the secondary base station, and notifies whether to establish the upper layer protocol resource and the lower layer protocol resource on the secondary base station. If the upper layer resource is established on the secondary base station, the master base station may notify the master base station and the secondary base station to determine the mapping of the QoS Flow to the DRB, and in the case that the mapping determined by the secondary base station is consistent with that by the master base station, the secondary base station uses the downlink receiving tunnel on the Xn interface corresponding to the old DRB adopted by the master base station, and sends the offloaded data to the tunnel to be sent to the UE by the master base station. In the case that the mapping determined by the secondary base station is different from that by the master base station, the secondary base station notifies the master base station of the new DRB identifier.

Step 501: sending, by the master base station, a secondary base station establishment request message or a secondary base station modification request message to the secondary base station.

The master base station/secondary base station may be an LTE base station or a 5G base station gNB. It is assumed that both the master base station and the secondary base station are connected to the 5G core network. Both the LTE base station and the 5G base station belong to the devices of 5G access network.

The master base station determines to establish certain QoS Flows on the secondary base station. These QoS Flows may have been previously mapped to one data radio bearer on the master base station, or be a new QoS Flow configured by the core network without corresponding data radio bearers that have been established. In order to reduce the data interruption time and support the continuity of the data, the master base station may request the secondary base station to establish the secondary bearer in two manners, of which, one is an explicit manner, and the other is an implicit manner. Below are details: in the explicit manner, the secondary base station establishment request message or the secondary base station modification request message carries one or more of the following information:

The location indication of the upper layer resource. For example, it indicates whether the PDCP is on the secondary base station or not. If not on the secondary base station, the PDCP identifier is established on the master base station.

The location indication of the lower layer resource. For example, it indicates whether the MCG RLC resource exists, whether the SCG RLC resource exists, or whether all resources exist, and if all exist, that corresponds to the split RLC resource.

The list of the QoS Flow identifiers. That corresponds to the identifiers of the QoS Flows to be established on the secondary base station, that is, the list of the identifiers of the QoS Flows to be offloaded. If the master base station indicates to establish the PDCP on the secondary base station, the secondary base station may determine the mapping of these QoS Flows to the data radio bearers. The identifiers of the QoS Flows are sent by the core network, which uses an initial context establishment process or an initial context modification process, to the master base station.

The quality requirement parameters of the QoS Flow. The information is the quality requirement corresponding to the QoS Flow, and may include the standard 5G quality requirement indication 5QI, the priority ARP, the uplink/downlink maximum rate of the GBR service, and the uplink/downlink guaranteed rate of the GBR service. Alternatively, specific quality requirement parameters are included, for example, the resource type, the priority level, the data delay target, the error rate, etc. The QoS Flow identifier and the corresponding quality requirement parameters are transmitted from the core network to the master base station, and the master base station may directly send the value transmitted by the core network to the secondary base station, or determine a new one according to the value transmitted from the core network to send to the secondary base station.

The identifier of the DRB. The DRB identifier is an identifier of the data radio bearer on the master base station mapped by the list of the QoS Flows to be offloaded to the secondary base station, wherein the secondary base station may know which QoS Flows are mapped to the same DRB on the master base station through the list of the identifiers of the QoS Flows and the DRB identifiers. If the secondary base station cannot accept these QoS Flows, the secondary base station may send a message to the master base station, and instruct that all QoS flows corresponding to the DRB cannot be established on the secondary base station through the DRB identifier. Alternatively, the master base station sends only the identifier of the DRB and the QoS quality requirement corresponding to the DRB, rather than the list of QoS Flows, and the secondary base station determines whether to accept or reject the establishment of the dual connectivity by using the DRB identifier and the corresponding QoS quality requirement, wherein the PDCP is established on the master base station in this case.

The list of the identifiers of the QoS Flows, wherein the QoS Flow in the list is mapped on the data radio bearer indicated by the DRB identifier. The list of the identifiers of the QoS Flows and the corresponding DRB identifiers indicate the mapping relationship between the QoS Flows and the DRBs on the master base station.

Instructing information, which indicates whether all QoS Flows mapped to the same DRB on the master base station are offloaded to the second node, or partial QoS Flows mapped to the same DRB are offloaded to the second node, that is, it indicates whether this is offloaded at the DRB level or at the QoS Flow level. If that is offloaded at the DRB level, the secondary base station may establish a data forwarding tunnel for the DRB to forward the PDCP data packet that has been mapped to the DRB and has not been successfully sent to the UE, and alternatively, the secondary base station may establish a data forwarding tunnel for the PDU session to forward the data packet that is received by the master base station and has not been mapped to the DRB, wherein that forwarding mechanism ensures that the data may not be lost during the establishing the dual connectivity. If that is offloaded at the QoS Flow level, then the secondary base station only establishes a data forwarding tunnel for the PDU session to forward the data packet that is received by the master base station and has not been mapped to the DRB.

For example, the indication information may be indicated by a displayed information element, for example, the indication information is set to one of the following:

"DRB offloading indication": if the message sent by the master base station to the secondary base station includes this indication information, it indicates that it is DRB offloading, and if not, it indicates that it is QoS Flow offloading. The DRB offloading means that all QoS Flows originally established on the DRB of the master base station are offloaded to the secondary base station, and the QoS Flow offloading means that the partial QoS Flows originally established on the DRB of the master base station are offloaded to the secondary base station. After the secondary base station receiving the indication information, the action of the secondary base station is: for the DRB offloading, the secondary base station may determine to use the old mapping, that is, also use the DRB identifier allocated by the first node for mapping the QoS Flow to the DRB, or the secondary base station determines to use the new mapping, that is, allocates a new DRB, and determines which QoS Flows are mapped to which DRBs. If it is QoS Flow offloading, then the secondary base station must adopt a new mapping, that is, allocating a new DRB identifier to determine which QoS Flows are mapped to which DRBs.

"QoS Flow offloading": if the message sent by the master base station to the secondary base station includes the indication information, it indicates that it is QoS Flow offloading, and if not, it indicates that it is the DRB offloading. After the secondary base station receiving the indication information, the actions of the secondary base station are as described above.

"Offloading Type", which may be further set to "QoS Flow offloading" or "DRB offloading". After the secondary base station receiving the indication information, the actions of the secondary base station are as described above.

Alternatively, the indication information may be obtained by using a list of the QoS Flows to be offloaded/established to the secondary base station and mapping information of the QoS Flows to the DRBs included in the message sent by the master base station to the secondary base station. The mapping information of the QoS Flows to the DRBs includes the identifiers of the DRBs established on the master base station and the list of all QoS Flows borne on the DRB. If the list of the QoS Flows to be offloaded is consistent with a list of all QoS Flow carried on one DRB, then it represents the DRB offloading, and if the QoS Flow list to be offloaded includes less QoS Flow identifiers than these in a list of all QoS Flows on the DRB, then it means the QoS Flow offloading. After the secondary base station receiving the indication information, the actions of the secondary base station are as described above.

Alternatively, the indication information may be obtained by whether the mapping information of the QoS Flows to the DRBs is included in the message sent by the master base station to the secondary base station. The mapping information of the QoS Flows to the DRBs includes the identifiers of the DRBs established on the master base station and the list of all QoS Flows borne on the DRB, in which it represents the DRB offloading if the message includes the mapping information, and is represents the QoS Flow offloading if the mapping information is not included. After the secondary base station receiving the indication information, the actions of the secondary base station are as described above.

Alternatively, the indication information may be obtained by whether the message sent by the master base station to the secondary base station includes the list of the mapped QoS Flows. The mapping information of the QoS Flows to the DRBs includes the identifiers of the DRBs established on the master base station and the list of all the QoS Flows borne on the DRB, and the list of the QoS Flows borne on the DRB is the list of the mapped QoS Flows. If the message includes the DRB identifiers and the list of the mapped QoS Flows, it represents the DRB offloading, and if only the DRB identifiers are included and the list of the mapped QoS Flows is not included, it represents the QoS Flow offloading. After the secondary base station receiving the indication information, the actions of the secondary base station are as described above.

Alternatively, the indication information indicates whether lossless of data is possible or impossible, for example it indicates that it is lossless possible, or the indication information indicates whether the secondary base station needs to establish a data forwarding tunnel for the DRB. if not receive the indication of the lossless possibility or the indication of establishing a data forwarding tunnel for the DRB, and the PDCP is established on the secondary base station, then the secondary base station may establish a data forwarding tunnel for the DRB to forward the PDCP data packet that has been mapped to the DRB and has not been successfully sent to the UE, and optionally, the secondary base station may also establish a data forwarding tunnel for the PDU session to forward the data packet that is received by the master base station and has not been mapped to the DRB, wherein that forwarding mechanism ensures that the data is not lost during the establishing the dual connectivity. If the secondary base station establishment request message does not indicate that lossless possibility, and the PDCP is established on the secondary base station, then the secondary base station only establishes a data forwarding tunnel for the PDU session to forward the data packet that is received by the master base station and has not been mapped to the DRB.

The identification information of the DRB available to the secondary base station. If the master base station indicates that the PDCP is established on the secondary base station, the secondary base station may determine the mapping of these QoS Flows to the data radio bearers. It is necessary to ensure that the identifier of the DRB allocated by the secondary base station cannot be consistent with the identifier of the DRB used by the master base station, and therefore, the master base station notifies the identification information of the DRB available to the secondary base station through the secondary base station establishment request message. There may be multiple manners to notify, for example, the master base station may be notified of the identifier list of the DRB that the master base station has configured for the UE, and the secondary base station may use the identifier of the DRB that the master base station has not configured yet; or the secondary base station is notified of the list of identifiers that the secondary base station may use, then the secondary base station may select one or more of them as the identifier of the DRB established by the secondary base station; or the secondary base station is notified of the range of the identifier of the DRB available for use. For example, when the master base stations QF1 and QF2 are mapped to DRB1, and the list of DRB identifiers available to the master base stations through the secondary base station is 10, 11, and 12, then the secondary base station may determine that QF1 is mapped to DRB10, and QF2 is mapped to DRB11.

Uplink and/or downlink data receiving address. The address corresponding to the data tunnel on the NG interface or the Xn interface, includes the IP address and the tunnel number.

The RRC transparent container, which in the RRC transparent container, a measurement report of the UE may be included. The identifier of the MCG split SRB and/or the configuration information of the corresponding RLC, MAC, and other layers, may also be included in the RRC transparent container.

In the second implicit manner, the secondary base station establishment request message or the secondary base station modification request message carries one or more of the following information:

The location indication of the upper layer resource.

The location indication of the lower layer resource.

The identification information of the QoS Flow, for example, the identifier of the QoS Flow that may be established on the secondary base station. The master base station may indicate which QoS Flows are established on the secondary base station under the type of bearer described above. The identifier of the QoS Flow is sent by the core network to the master base station, which the core network sends the QoS Flow identifier and the quality requirement corresponding to the QoS Flow identifier to the master base station through an initial context establishment process, an initial context modification process, or a data connection process. The identifier information of the bearer also includes the data connection identifier (PDU Session ID) to which the QoS Flow belongs.

The quality requirement parameter of the QoS Flow. The information is the quality requirement corresponding to the QoS Flow, and may include the standard 5G quality requirement indication 5QI, the priority ARP, the uplink/downlink maximum rate of the GBR service, and the uplink/downlink guaranteed rate of the GBR service. Alternatively specific quality requirements parameters are included, for example, the resource type, the priority level, the data delay target, the error rate, etc. The QoS Flow identifier and the corresponding quality requirement parameters are transmitted from the core network to the master base station, and the master base station may directly send the value transmitted by the core network to the secondary base station, or determine a new one according to the value transmitted from the core network to send to the secondary base station.

If the master base station indicates that the PDCP is established on the secondary base station in the secondary base station establishment request message, and all QoS Flows originally established on a certain DRB of the master base station are offloaded to the secondary base station, the secondary base station establishment request carries the DRB identifier (i.e. the old DRB identifier). If the secondary base station establishment request message indicates that the PDCP is established on the secondary base station, but only the QoS Flows of the corresponding partial DRBs are offloaded to the secondary base station, the secondary base station establishment request message only carries the information of the QoS Flow to be offloaded, including the list of the identifiers of the QoS Flows, QoS and other information, rather than the identifier of the old DRB on the master base station corresponding to the QoS Flow to be offloaded. In this way, if receiving the secondary base station establishment request message indicating that the PDCP is established on the secondary base station, and including the old DRB identifier on the master base station, then the secondary base station may determine whether to change the mapping of the QoS Flow to the DRB, and if there is no change, the secondary base station continues to user the DRB identifier to indicate the radio bearer of the air interface, and the secondary base station may establish a data forwarding tunnel for the DRB to forward the PDCP data packet that has been mapped to the DRB and has not been successfully sent to the UE, and optionally, the secondary base station may establish a data forwarding tunnel for the PDU session to forward the data packet that is received by the master base station and has not been mapped to the DRB, wherein that forwarding mechanism ensures that the data is not lost during the establishing the dual connectivity. If the secondary base station determines to use a different mapping, that is, to change the mapping of QoS Flow to DRB, then the secondary base station only establishes a data forwarding tunnel for the PDU session to forward the data packet that is received by the master base station and has not been mapped to the DRB. If the old DRB identifier is not included, it means that the QoS Flow offloading, and the secondary base station may determine the mapping of QoS Flow to DRB by itself.

The identification information of the DRB available to the secondary base station. If the master base station indicates that the PDCP is established on the secondary base station, the secondary base station may determine the mapping of these QoS Flows to the data radio bearers. It is necessary to ensure that the identifier of the DRB allocated by the secondary base station cannot be consistent with the identifier of the DRB used by the master base station, and therefore, the master base station notifies the identification information of the DRB available to the secondary base station through the secondary base station establishment request message. There may be multiple manners to notify, for example, the master base station may be notified of the identifier list of the DRB that the master base station has configured for the UE, and the secondary base station may use the identifier of the DRB that the master base station has not configured yet; or the secondary base station is notified of the list of identifiers that the secondary base station may use, then the secondary base station may select one or more of them as the identifier of the DRB established by the secondary base station; or the secondary base station is notified of the range of the identifier of the DRB available for use. For example, when the master base stations QF1 and QF2 are mapped to DRB1, and the list of DRB identifiers available to the master base stations through the secondary base station is 10, 11, and 12, then the secondary base station may determine that QF1 is mapped to DRB10, and QF2 is mapped to DRB11.

Uplink and/or down link data receiving address. The address corresponding to the data tunnel on the NG interface or the Xn interface, includes the IP address and the tunnel number.

The RRC transparent container, which in the RRC transparent container, a measurement report of the UE may be included. The identifier of the MCG split SRB and/or the configuration information of the corresponding RLC, MAC, and other layers, may also be included in the RRC transparent container.

Step 502: sending, by secondary base station, the secondary base station establishment response message or the secondary base station modification response message to the master base station.

The secondary base station establishment response message or a secondary base station modification response message includes one or more of the following information:

The list of the QoS Flows accepted by the secondary base station. For the quality flow QoS Flow determined by the master base station to be offloaded to the secondary base station, the secondary base station may determine to accept certain QoS Flows and reject certain QoS Flows. In the secondary base station establishment response message, the secondary base station notifies the master base station of which QoS is accepted and which QoS Flows are rejected.

The radio bearer DRB identifier established by the secondary base station. In the secondary base station establishment request message, the master base station determines that the PDCP is established on the secondary base station, and the master base station also indicates which QoS Flows need to be offloaded to the secondary base station, and the secondary base station may determine the mapping of the QoS Flow to the DRB. If the secondary base station determines to use the new mapping, the new mapping uses the new DRB identifier. The secondary base station selects a new DRB identifier from the available DRB identifier range according to the identifier information of the DRB available to the secondary base station obtained in Step 501. The message in Step 502 may carry the identifier of the new DRB corresponding to the QoS Flow.

If the identification information of the DRB available to the secondary base station is not available in Step 501, the range of the identifier of the DRB available to the secondary base station may be configured or operated by the protocol, and the master base station and the secondary base station are configured with the corresponding range of the identifier of the DRB to ensure that the identifiers of the DRBs configured by the master and secondary base stations for the same UE are different, which resulting a disadvantage of inflexible. Alternatively, the secondary base station sends a message, i.e., a new message defined between Steps 501 and 502, to the master base station, and notifies the master base station that several DRB identifiers are needed, and the master base station sends a message, i.e., the new message defined between Steps 501 and 502, and the corresponding DRB identifier to the secondary base station. After obtaining the corresponding DRB identifier, the secondary base station carries the identifier of the new DRB in the message of Step 502.

The RRC transparent container, in which, the configuration information of the secondary base station to the UE may be included. The master base station forwards the RRC transparent container to the UE in Step 503.

Step 503: sending, by the master base station, an RRC configuration request message to the UE.

The master base station does not resolve the RRC container sent by the secondary base station, and forwards the RRC container to the UE. The master base station may add its own configuration information to the UE and send it to the UE together with the configuration information of the secondary base station.

Step 504: sending, by the UE, an RRC configuration complete message to the master base station.

After successfully configuring the UE, the response message is sent to the master base station. The response message may include a response to the configuration information of the master base station, as well as a response to the configuration information of the secondary base station. If necessary, the UE also needs to perform a random access procedure with the new secondary base station and synchronize with the new secondary base station. After synchronizing, the secondary base station may begin to transmit data to the UE.

Step 505: sending, by the master base station, a secondary base station reconfiguration complete message to the secondary base station.

The master base station notifies the secondary base station of the information that the configuration of the UE is successful. Since the UE sends an acknowledgment message to the master base station, the master base station needs to forward the acknowledgment message to the secondary base station. If the master base station cannot resolve the response of the UE to the configuration information of the secondary base station, the master base station may forward the response of the UE to the configuration information of the secondary base station to the secondary base station in the form of the RRC container.

Step 506: sending, by the master base station, a PDU Session modification indication core network.

If the secondary base station establishes a new connection with the core network, the master base station needs to send a new downlink data receiving address to the core network. The message carries the PDU Session identifier and the corresponding downlink data receiving address.

The description of this embodiment ends here. It should be noted that this embodiment omits some known information and steps.

Figure 6:
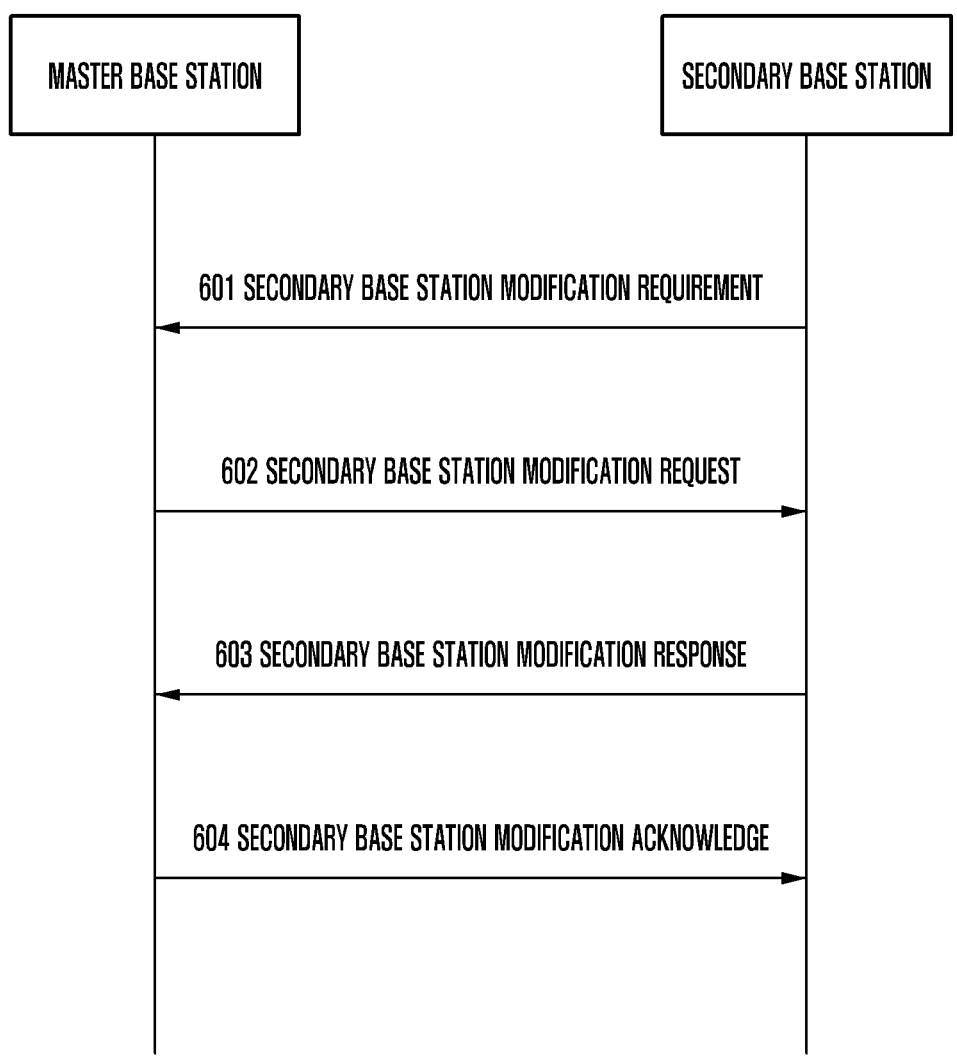
FIG. 6 is a schematic diagram of the second embodiment of the present application.

FIG. 6 illustrates the second embodiment of the present application, which shows a modification process initiated by the secondary base station. When the state of the resource on the secondary base station changes, the resource state includes the resource state corresponding to the upper layer protocol (SDAP and/or PDCP) and the resource state corresponding to the lower layer protocol (RLC, MAC, physical layer), the state of the air interface transmission belongs to the resource corresponding to the lower layer protocol, and the secondary base station initiates a modification process of the secondary base station.

Step 601: sending, by the secondary base station, a secondary base station modification requirement message, which the message is sent to the master base station.

The master base station/secondary base station may be an LTE base station or a 5G base station gNB. Both the master base station and the secondary base station are connected to the 5G core network, or the master base station is connected to the LTE core network and the secondary base station is connected to the 5G core network.

The state of the resource established for the radio bearer on the secondary base station has been changed, for example, if the upper layer protocol is originally established on the secondary base station, and the upper layer protocol has insufficient data processing capability currently, then the upper layer protocol (including SDAP and/or PDCP) needs to be established on the master base station, or if the lower layer protocol has insufficient data processing capability, or the lower layer protocol needs to be established on the master base station due to quality deterioration of the air interface signal, then the secondary base station sends the secondary base station modification required message to the master base station.

Specifically, the secondary base station establishment request message carries one or more of the following information:

The information whether the upper layer protocol is on the secondary base station.

The information whether the lower layer protocol is on the master base station or the lower layer protocol is on the secondary base station, which may be configured to that the lower lay protocol is both on the master base station and the secondary base station.

If the upper layer protocol is on the secondary base station, the lower layer protocol on the master base station, or the lower layer protocol is both on the master base station and the secondary base station, the message needs to carry the QoS parameter of the bearer corresponding to the requested master base station MCG resource, or the message carries the list of the QoS Flow identifiers corresponding to the MCG resource of the master base station and the QoS requirement corresponding to the QoS Flows, and the QoS parameter corresponding to bearer is determined by the master base station itself. The message may further include an uplink data receiving address allocated by the secondary base station for receiving uplink data from the master base station.

If the upper layer protocol is not on the secondary base station, that is, on the master base station, the lower layer protocol on the secondary base station, or the lower layer protocol is on both the master base station and the secondary base station, the message needs to carry the QoS parameter of the bearer corresponding to the maximum available SCG resource of the secondary base station, or the message caries the list of the identifiers of the QoS Flows corresponding to the secondary base station SCG resource and the maximally available QoS requirement corresponding to the QoS Flow. The message may also include a downlink data receiving address allocated by the secondary base station for receiving downlink data from the master base station.

Step 602: sending, by the master base station, a secondary base station modification request message to the secondary base station.

If the master base station accepts the modification of the secondary base station, the master base station sends a secondary base station modification request message to the secondary base station. If the master base station rejects the modification of the secondary base station, the messages of Steps 602 and 603 are not performed, and the master base station directly sends the message of Step 604.

The secondary base station modification request message includes one or more of the following information:

The information whether the upper layer protocol is on the secondary base station.

The information whether the lower layer protocol is on the master base station or the lower layer protocol is on the secondary base station, which may be configured to that the lower lay protocol is both on the master base station and the secondary base station.

If the upper layer protocol is on the secondary base station, the lower layer protocol on the master base station, or the lower layer protocol is both on the master base station and the secondary base station, the message needs to carry the QoS parameter of the bearer corresponding to the maximally available MCG resource of the master base station, or the message needs carries the list of the identifiers of the QoS Flows corresponding to the master base station MCG resource and the maximally available requirement corresponding to the QoS Flow. The message may further include an uplink data receiving address allocated by the master base station for receiving uplink data from the master base station.

If the upper layer protocol is not on the secondary base station, that is, on the master base station, the lower layer protocol on the secondary base station, or the lower layer protocol is both on the master base station and the secondary base station, the message needs to carry the QoS parameter of the bearer corresponding to the SCG resource that the secondary base station needs to provide, or the message carries the identifier list of the QoS Flow corresponding to the SCG resource of the secondary base station and the QoS requirement that the QoS Flow needs to provide. The message may also include a downlink data receiving address allocated by the master base station for receiving downlink data from the master base station.

Step 603: sending, by the secondary base station, a secondary base station modification response message to the master base station.

The secondary base station modification response message includes an identifier for successfully establishing a bearer, or a list of identifiers for successfully establishing a QoS Flow.

Step 604: sending, by the master base station, a secondary base station modification acknowledge to the secondary base station.

The secondary base station modification acknowledge message includes one or more of the following information:

a list of information failed to be established, which the list may include an E-RAB identifier, or a DRB identifier, or a QoS Flow identifier.

The description of this embodiment ends here. It should be noted that this embodiment omits some known information and steps.

Figure 7:
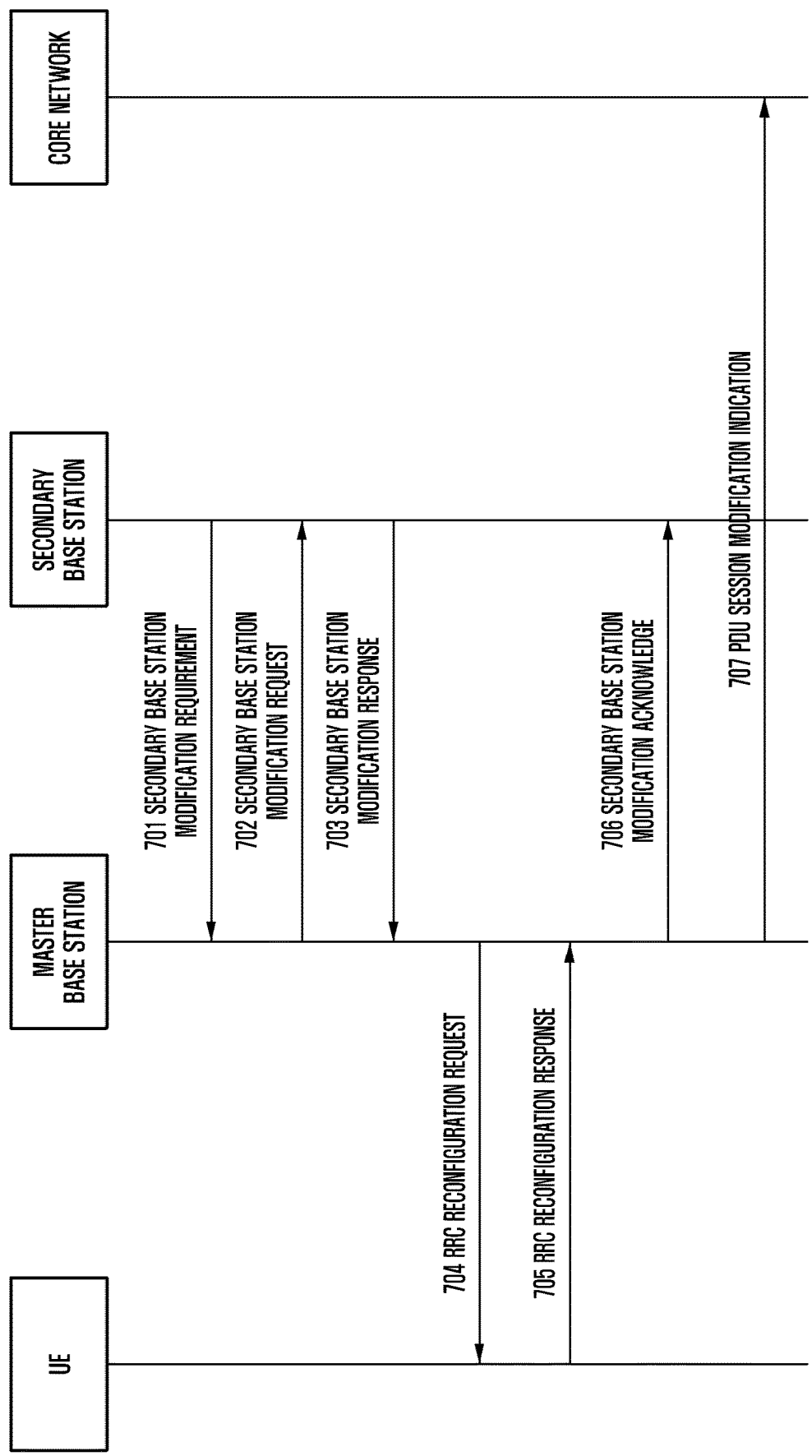
FIG. 7 is a schematic diagram of the third embodiment of the present application; and, FIG. 8 is block diagram of the device of the present application.

FIG. 7 illustrates the third embodiment of the present application, which shows a modification process initiated by the secondary base station. When the state of the resource on the secondary base station changes, the resource state includes the resource state corresponding to the upper layer protocol (SDAP and/or PDCP) and the resource state corresponding to the lower layer protocol (RLC, MAC, physical layer), the state of the air interface transmission belongs to the resource corresponding to the lower layer protocol, and the secondary base station initiates a modification process of the secondary base station.

Step 701: sending, by the secondary base station, a secondary base station modification requirement message, which the message is sent to the master base station.

The master base station/secondary base station may be an LTE base station or a 5G base station gNB. Both the master base station and the secondary base station are connected to the 5G core network, or the master base station is connected to the LTE core network and the secondary base station is connected to the 5G core network.

The state of the resource established for the radio bearer on the secondary base station has been changed, for example, if the upper layer protocol is originally established on the secondary base station, and the upper layer protocol has insufficient data processing capability currently, then the upper layer protocol (including SDAP and/or PDCP) needs to be established on the master base station, or if the lower layer protocol has insufficient data processing capability, or the lower layer protocol needs to be established on the master base station due to quality deterioration of the air interface signal, then the secondary base station sends the secondary base station modification required message to the master base station.

Specifically, the secondary base station establishment request message carries one or more of the following information:
- The identifier of bearer releasing, which may be an E-RAB identifier, a DRB identifier, or an identifier of the QoS Flow or a list of identifiers of the QoS Flow.
- The indication information. The indication is released because of which part of the resources has a problem, for example, the release may be indicated because of one or more of the following information:
  - the resource overloading corresponding to the upper layer protocol, for example, PDCP;
  - the resource overloading corresponding to the lower layer protocol, for example, RLC Bearer overloading.

After receiving the indication information, the master base station may further determine which part of the resources on the secondary base station is still available, thereby determining whether to configure corresponding resources on the secondary base station. For example, the secondary base station indicates to release a certain bearer, and indicates that the resources corresponding to the upper layer protocol are overloaded, and the master base station may establish the upper layer resources of the bearer on the master base station, the lower layer resources of the bearer on the secondary base station. If the master base station does not know the indication information, the master base station may only release all the resources established on the secondary base station, including the resources corresponding to the upper layer protocol and the resource corresponding to the lower layer protocol.

Alternatively, it indicates which part of the resources is still available, for example, indicating one or more of the following:
- The available upper layer resources.
- The available lower layer resources.

After receiving the indication information, the master base station may further determine which part of the resources on the secondary base station is still available, thereby determining whether to configure corresponding resources on the secondary base station. For example, secondary base station indicates to release a certain bearer, and indicates that the resources corresponding to the upper layer protocol are overloaded, and the master base station may establish the upper layer resources of the bearer on the master base station, the lower layer resources of the bearer on the secondary base station. If the master base station does not know the indication information, the master base station may only release all the resources established on the secondary base station, including the resources corresponding to the upper layer protocol and the resource corresponding to the lower layer protocol.

Step 702: sending, by the master base station, a secondary base station modification request message to the secondary base station.

After receiving the indication information, the master base station may further determine which part of the resources on the secondary base station is still available, thereby determining whether to configure corresponding resources on the secondary base station. For example, the secondary base station indicates to release a certain bearer, and indicates that the resources corresponding to the upper layer protocol are overloaded, and the master base station may establish the upper layer resources of the bearer on the master base station, the lower layer resources of the bearer on the secondary base station. If the master base station does not know the indication information, the master base station may only release all the resources established on the secondary base station, including the resources corresponding to the upper layer protocol and the resource corresponding to the lower layer protocol. If the master base station determines to continue to use these resources, or configure to use a part of the resources on the secondary base station, the master base station sends a secondary base station modification request message to the secondary base station, in which the message including configuration information for the corresponding resources.

The secondary base station modification request message includes one or more of the following information:
- The information whether the upper layer protocol is on the secondary base station.
- The information whether the lower layer protocol is on the master base station or the lower layer protocol is on the secondary base station, which may be configured to that the lower lay protocol is both on the master base station and the secondary base station.
- If the upper layer protocol is on the secondary base station, the lower layer protocol on the master base station, or the lower layer protocol is both on the master base station and the secondary base station, the message needs to carry the QoS parameter of the bearer corresponding to the maximally available MCG resource of the master base station, or the message needs carries the list of the identifiers of the QoS Flows corresponding to the master base station MCG resource and the maximally available requirement corresponding to the QoS Flow may provide QoS requirements. The message may further include an uplink data receiving address allocated by the master base station for receiving uplink data from the master base station.
- If the upper layer protocol is not on the secondary base station, that is, on the master base station, the lower layer protocol is on the secondary base station, or the lower layer protocol is both on the master base station and the secondary base station, the message needs to carry the QoS parameter of the bearer corresponding to the SCG resource that the secondary base station needs to provide, or the message carries the identifier list of the QoS Flow corresponding to the SCG resource of the secondary base station and the QoS requirement that the QoS Flow needs to provide. The message may also include a downlink data receiving address allocated by the master base station for receiving downlink data from the master base station.

Step 703: sending, by the secondary base station, a secondary base station modification response message to the master base station.

The secondary base station modification response message includes an identifier for successfully establishing a bearer, or a list of identifiers for successfully establishing a QoS Flow.

Step 704: sending, by the master base station, an RRC configuration request message to the UE.

The master base station does not resolve the RRC container sent by the secondary base station, and forwards the RRC container to the UE. The master base station may add its own configuration information to the UE and send it to the UE together with the configuration information of the secondary base station.

Step 705: sending, by the UE, an RRC configuration complete message to the master base station.

After successfully configuring the UE, the response message is sent to the master base station. The response message may include a response to the configuration information of the master base station, as well as a response to the configuration information of the secondary base station. If necessary, the UE also needs to perform a random access procedure with the new secondary base station and synchronize with the new secondary base station. After synchronizing, the secondary base station may begin to transmit data to the UE.

Step 706: sending, by the master base station, a secondary base station modification acknowledge to the secondary base station.

The message of the secondary base station modification acknowledge may include an RRC transparent container, which may include an RRC configuration complete message sent by the UE.

Step 707: sending, by the master base station, a PDU Session modification indication core network.

If the secondary base station establishes a new connection with the core network, the master base station needs to send a new downlink data receiving address to the core network. The message carries the PDU Session identifier and the corresponding downlink data receiving address.

The description of this embodiment ends here. It should be noted that this embodiment omits some known information and steps.

Figure 8:
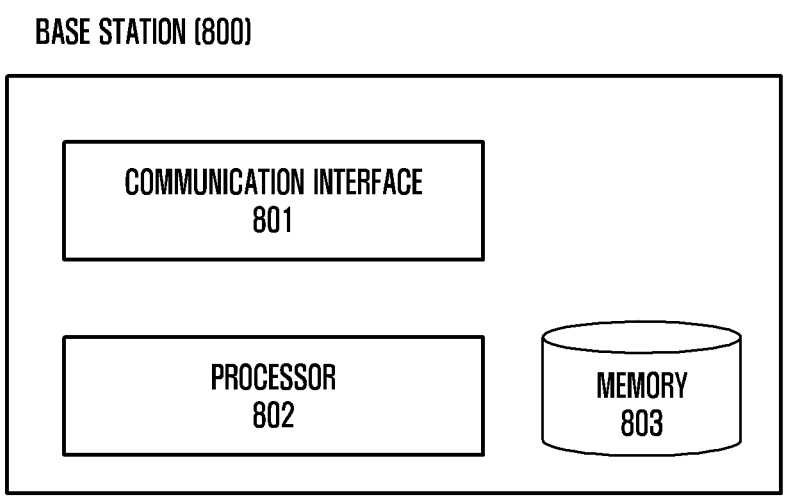

FIG. 8 schematically shows a structural block diagram of a master base station or a secondary base station that performs the method for establishing dual connectivity, according to an exemplary embodiment of the present application. As shown in FIG. 8, the master or secondary base station includes a communication interface 801 for external communication; a processing unit or processor 802, which may be a single unit or a combination of multiple units for performing different steps of the method; a memory 803, storing computer executable instructions therein, that, when executed by the processor 802, enable the master base station or the secondary base station to perform the embodiments of the present application.

When the instructions are executed by the processor 802, if that shown in FIG. 8 is a master base station, the master base station 800 performs the following operations:

sending, by the communication interface 801, a secondary base station establishment request message to the secondary base station, wherein the message carries the related information of the mapping of the QoS Flow to the data radio bearer (DRB); the related information of the mapping carries the indication information; and, receiving the response information in response to the mapping related information from the secondary base station via the communication interface 801; and transmitting data to the second node based on the response information.

In an exemplary embodiment, the secondary base station establishment request message may include one or more pieces of the following information:

the identifier of the data radio bearer DRB;

the list of QoS Flow identifiers;

the instructing information, which indicates whether it is DRB offloading;

the first related information of the DRB identifier to be sent to a second node, for example, the first related information may be a list of identifiers of the DRBs available to the secondary base station.

In an exemplary embodiment, the secondary base station establishment response message may include one or more of the following information:

the DRB allocated by the secondary base station;

the tunnel information allocated by the secondary base station.

The processor 802 may be a single CPU (Central processing unit), but may also include two or more processing units. For example, the processor may include a general purpose microprocessor; an instruction set processor and/or a related chip sets and/or a special purpose microprocessor such as Application Specific Integrated Circuit (ASICs). The processor may also include board memory for caching purposes. The computer program may be carried by a computer program product connected to the processor. The computer program product may include a computer readable medium on which the computer program is stored. For example, the computer program product may be a flash memory, a Random-Access Memory (RAM), a Read-Only Memory (ROM), or an EEPROM, and the computer program modules described above in alternative embodiments could be distributed on different computer program products in the form of memories within the UE.

The present disclosure is described above with reference to the embodiments thereof. It should be understood that various other changes, substitutions and additions may be made by those skilled in the art without departing from the spirit and scope of the present disclosure. Accordingly, the scope of the present disclosure is not limited to the specific embodiments described above, but should be defined by the appended claims.

The foregoing is merely illustrative of the specific embodiments of the present disclosure and is not intended to be limiting of the present disclosure, and that any modifications, equivalents, improvements, etc., which fall into the spirit and principles of this disclosure, are intended to be included within the scope of the present disclosure.

The invention claimed is:

1. A method performed by a first node being a master node (MN) of a dual connectivity (DC) for a terminal in a communication system, the method comprising:

transmitting, to a second node, a request message for configuring the second node as a secondary node (SN) of the DC, the request message including information on at least one available data radio bearer (DRB) identifier (ID) for a bearer, wherein the at least one available DRB ID is not used by the first node;

receiving, from the second node, a response message for the request message, wherein the response message includes information on a DRB ID assigned based on the at least one available DRB ID;
receiving, from the second node, a first message including information on a required number of DRB IDs;
determining at least one DRB ID for the bearer based on the required number of DRB IDs; and
transmitting, to the second node, a second message including information on the at least one DRB ID,
wherein a packet data convergence protocol (PDCP) for the bearer is located in the second node.

2. The method of claim 1,
wherein the request message further includes information on a QoS flow, to be offloaded from the first node to the second node, and information on mapping between the QoS flow and a DRB for the first node, and
wherein the response message further includes information indicating the QoS flow is accepted.

3. The method of claim 2, wherein the response message includes information on a tunnel for forwarding data to the second node.

4. The method of claim 1,
wherein the DRB ID assigned based on the at least one available DRB ID is associated with a packet data unit (PDU) session ID.

5. A method performed by a second node in a communication system, the method comprising:
receiving, from a first node being a master node (MN) of a dual connectivity (DC) for a terminal, a request message for configuring the second node as a secondary node (SN) of the DC, the request message including information on at least one available data radio bearer (DRB) identifier (ID) for a bearer, wherein the at least one available DRB ID is not used by the first node;
transmitting, to the first node, a response message for the request message, wherein the response message includes information on a DRB ID assigned based on the at least one available DRB ID;
transmitting, to the first node, a first message including information on a required number of DRB IDs; and
receiving, from the first node, a second message including information on at least one DRB ID for the bearer,
wherein the at least one DRB ID is determined based on the required number of DRB IDs, and
wherein a packet data convergence protocol (PDCP) for the bearer is located in the second node.

6. The method of claim 5,
wherein the request message further includes information on a QoS flow, to be offloaded from the first node to the second node, and information on mapping between the QoS flow and a DRB for the first node, and
wherein the response message further includes information indicating the QoS flow is accepted.

7. The method of claim 6, wherein the response message includes information on a tunnel for forwarding data to the second node.

8. The method of claim 5,
wherein the DRB ID assigned based on the at least one available DRB ID is associated with a packet data unit (PDU) session ID.

9. A first node being a master node (MN) of a dual connectivity (DC) for a terminal in a communication system, comprising:
a transceiver; and
at least one processor configured to:
transmit, to a second node, a request message for configuring the second node as a secondary node (SN) of the DC, the request message including information on at least one available data radio bearer (DRB) identifier (ID) for a bearer, wherein the at least one available DRB ID is not used by the first node,
receive, from the second node, a response message for the request message, wherein the response message includes information on a DRB ID assigned based on the at least one available DRB ID,
receive, from the second node, a first message including information on a required number of DRB IDs,
determine at least one DRB ID for the bearer based on the required number of DRB IDs, and
transmit, to the second node, a second message including information on the at least one DRB ID,
wherein a packet data convergence protocol (PDCP) for the bearer is located in the second node.

10. The first node of claim 9,
wherein the request message further includes information on a QoS flow, to be offloaded from the first node to the second node, and information on mapping between the QoS flow and a DRB for the first node, and
wherein the response message further includes information indicating the QoS flow is accepted.

11. The first node of claim 10, wherein the response message includes information on a tunnel for forwarding data to the second node.

12. The first node of claim 9,
wherein the DRB ID assigned based on the at least one available DRB ID is associated with a packet data unit (PDU) session ID.

13. A second node in a communication system, comprising:
a transceiver; and
at least one processor configured to:
receive, from a first node being a master node (MN) of a dual connectivity (DC) for a terminal, a request message for configuring the second node as a secondary node (SN) of the DC, the request message including information on at least one available data radio bearer (DRB) identifier (ID) for a bearer, wherein the at least one available DRB ID is not used by the first node,
transmit, to the first node, a response message for the request message, wherein the response message includes information on a DRB ID assigned based on the at least one available DRB ID,
transmit, to the first node, a first message including information on a required number of DRB IDs, and
receive, from the first node, a second message including information on at least one DRB ID for the bearer,
wherein the at least one DRB ID is based on the required number of DRB IDs, and
wherein a packet data convergence protocol (PDCP) for the bearer is located in the second node.

14. The second node of claim 13,
wherein the request message further includes information on a QoS flow, to be offloaded from the first node to the second node, and information on mapping between the QoS flow and a DRB for the first node, and
wherein the response message further includes information indicating the QoS flow is accepted.

15. The second node of claim 14, wherein the response message includes information on a tunnel for forwarding data to the second node.

16. The second node of claim 13,
wherein the DRB ID assigned based on the at least one available DRB ID is associated with a packet data unit (PDU) session ID.

\* \* \* \* \*